June 18, 1957    G. E. BANTA ET AL    2,795,974
FORMING TOOL
Filed May 4, 1953
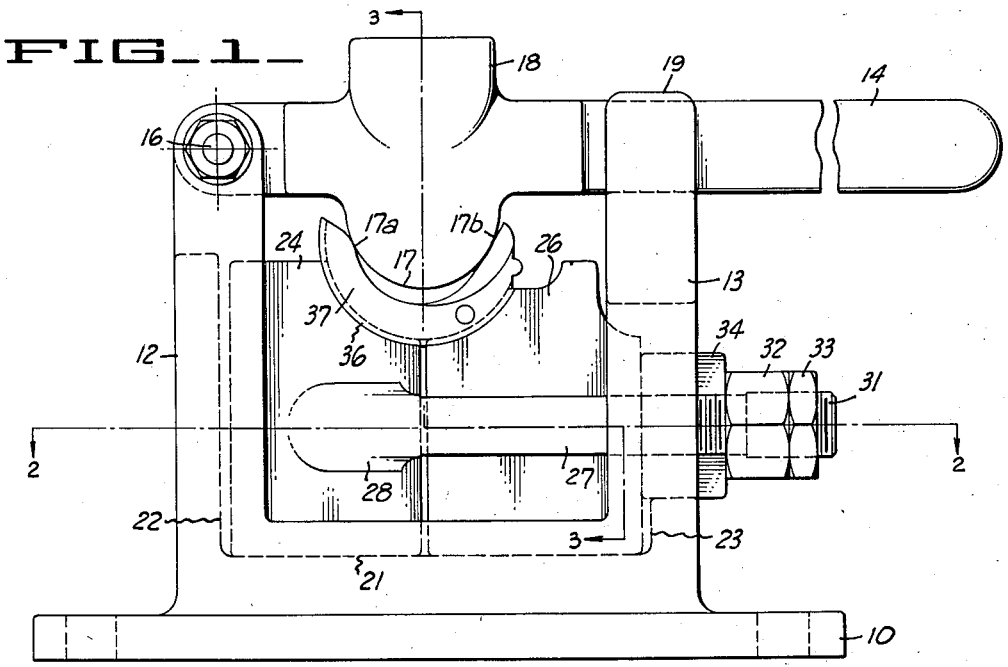
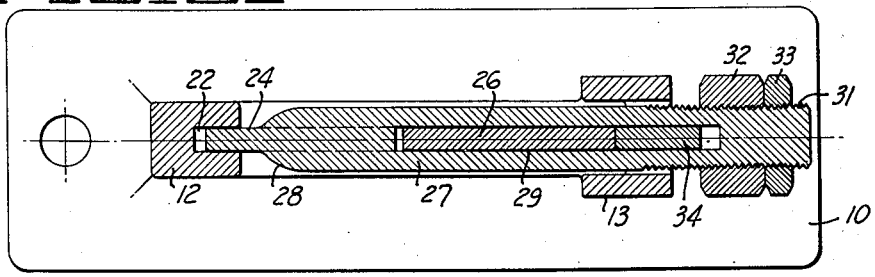
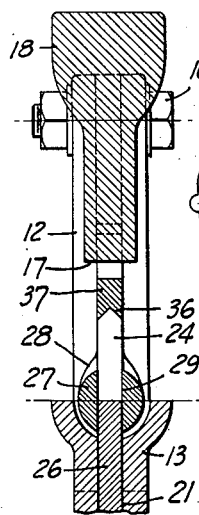
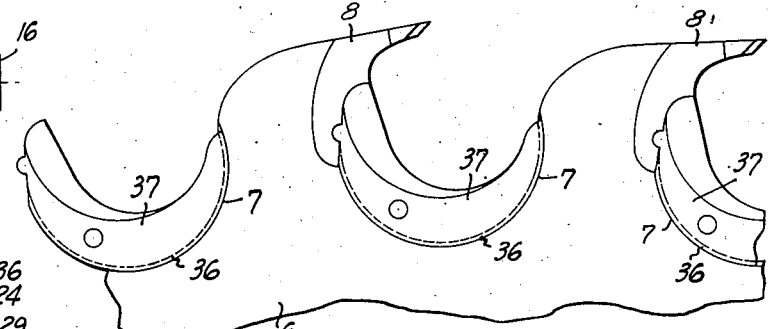
INVENTORS
G. E. BANTA
B. F. WADE
BY J. W. BARTOW
ATTORNEYS

United States Patent Office 2,795,974
Patented June 18, 1957

2,795,974

FORMING TOOL

George E. Banta, Willits, Calif., Benjiman F. Wade, Grants Pass, Oreg., and Joseph W. Bartow, Willits, Calif.

Application May 4, 1953, Serial No. 352,878

6 Claims. (Cl. 76—25)

This invention relates to a forming tool for shaping arcuate shanks such as are used to lock saw bits into the semi-circular sockets of circular saw plates.

In the lumbering industry, large circular saws are used in which the cutting bits are held in place by shanks which are shaped substantially as a semi-circular lock ring. These shanks are sprung into semi-circular sockets formed in the periphery of the saw plate, and they serve to hold the cutting bits in place. By removing the shanks it is possible to insert new bits whenever necessary.

In the operation of such inserted tooth saws, it is necessary that the shanks be kept tight at all times. It has been found that shanks tend to loosen during use of the saw due to wear of the seating surfaces or because they take a permanent set due to the stresses applied. Such loosening of the shank may not be sufficient to allow it to be thrown out, but may allow the bit to vibrate with resulting defective operation and excessive wear of the saw plate. In general it will be evident that the maintenance of tight shanks makes for efficient operation and extends the useful life of the saw.

In the past when a loose shank was found, it has been customary to reshape the shank as by peening its inner edge with a hammer. This method is unsatisfactory, particularly because of the time and labor involved, and because it seldom reshapes a shank to an optimum form.

It is an object of the present invention to provide a forming tool which will accurately reshape the shanks so that they will fit as tightly as when new.

Another object of the invention is to provide a forming tool which will make possible an accurate reshaping operation with a minimum amount of time and labor.

Another object of the invention is to provide a forming tool which will be adjustable for different types and sizes of shanks.

Additional objects of the invention will appear from the following description in which the preferred embodiment has been set forth in detail in conjunction with the accompanying drawing.

Referring to the drawing:

Figure 1 is a front elevational view illustrating a device incorporating our invention.

Figure 2 is a cross-sectional view taken along the line 2—2 of Figure 1.

Figure 3 is a cross-sectional view taken along the line 3—3 of Figure 1.

Figure 4 is a section of an inserted tooth saw.

The circular saw section illustrated in Figure 4 shows the saw plate 6 provided with semi-circular sockets 7 along its periphery. Shanks 37 are sprung into these sockets 7 to hold the cutting bits 8 in place.

The device incorporating our invention and illustrated in the drawing (Figures 1, 2 and 3) consists of a base 10 which forms a mounting for the upwardly extending members 12 and 13. A hand operated arm 14, as shown in Figure 1, is pivotally secured to member 12 by means of bolt 16. A spreading member 17 is carried by the lower edge of arm 14, and the lower surface of this spreading member is preferably arcuately contoured on a radius which is somewhat greater than the radius of the shank to be reshaped. Thus, as illustrated in Figure 1, the radius is such that the spreading member 17 engages the end portions of the shank 37 along the spaced areas 17a and 17b. The upper end portion 19 of member 13 is forked to provide a suitable guide means for the arm 17.

The tool is provided with swaging members serving to cooperate with the spreading member 17. Thus the base 10 is provided with groove 21, which is aligned with grooves 22 and 23 in the members 12 and 13. These grooves serve to accommodate the swage plates 24 and 26, whereby these plates can be adjusted laterally with respect to each other and with respect to the spreading member 17.

Means are provided whereby the swage plates can be adjusted and held in a desired adjusted position. The particular means illustrated in the drawing includes a rod 27 which is split and which has its one end attached to the swage plate 24 as indicated at 28, the attachment being by suitable means such as welding. The slot 29 provided by the split rod 27 is dimensioned to accommodate the swage plate 26.

The rod 27 loosely extends through an opening in member 13 and its outer end is threaded to receive the nut 32. A spacer plate 34 is loosely disposed in a slot 29 formed in member 13, and the inner edge of this plate engages the adjacent edge of the plate 26. It will be evident that adjustment of the nut 32 causes the swage plates 24 and 26 to be adjusted with respect to each other and to be held in an adjusted position. After nut 32 has been adjusted to a desired position it can be locked as by means of the lock nut 33.

The shank 37 shown in Figure 3 may be of the type to which the tool is applicable, and is provided with an arcuate peripheral seating surface 36, which in section is a V-shaped groove. The swage plates are similarly provided with arcuate seating surfaces 38 and 39, which in section are V-shaped to interfit with the seating surface of the shank.

Operation of the device described above is as follows: When it is desired to reshape a shank whereby the radius of its arcuate contour is slightly increased, the shank is fitted upon the swage plates 24 and 26 in the manner illustrated in Figure 1, and the arm 14 is swung downwardly whereby the spreading member 17 is engaged with the end portions of the shank. The relative position of the swage plates 26 and 27 should be such that the outer periphery of the shank engages the swage plates in a region substantially coincident with the vertical center line of member 17, and whereby there is sufficient clearance between the end portions of the shank and the swage plates to permit the desired amount of reforming. The operator now strikes member 18 with a hammer or like tool whereby the force of the impact is applied to the end portions of the shank along the regions 17a and 17b thus causing the shank to be permanently bent to conform with the arcuate seating surfaces of the swage plates. Assuming that the swage plates have been properly positioned, the shank has been reformed whereby it may be reapplied to the socket of the saw plate, with proper clamping of the bit. If it is found that the shank has not been reformed to the degree required, then it is repositioned within the tool, the swage plates 24 and 26 readjusted, and the shank again reformed by a hammer blow upon member 18.

It will be evident from the foregoing that we have provided a simple tool for reforming shanks so that they may be kept tight at all times. Accurate reforming operations can be carried out with a minimum amount of labor and time, thus making possible a substantial saving in the servicing of circular saws.

The tool can be adjusted to operate upon different sizes and types of shanks. If the sizes and types which one desires to service vary greatly then the tool can be provided with several sets of swage plates which are formed in accordance with the different sizes or types of shanks.

We claim:

1. In a forming tool for arcuate shanks used in inserted tooth saws, a base, a pair of upright members attached to the base, a pair of swage plates movably held by said base and said upright members, adjustable means for varying the positions of said swage plates with respect to each other to engage the arcuate periphery of a shank for holding the same, an arm pivotally mounted on one of the said upright members, a spreading member formed on said arm and adapted to overlie the shank held by said swage plates and an impact receiving surface formed on said arm above said spreading member.

2. A tool as in claim 1 in which the upper edges of the swage plates are provided with arcuate inverted V-shaped seating surfaces adapted to engage the outer peripheral V-shaped surface of the shank.

3. In a forming tool for arcuate shanks of the type used in inserted tooth saws and having arcuate peripheral surfaces which in section are V-shaped grooves, a base, a pair of swage plates having one side of the same slidably mounted in said upright members, said swage plates being in the same plane and having arcuate seating surfaces which in section form inverted V's and are adapted to interfit with the groove in said shank, means for varying the position of said swage plates with respect to each other to engage the arcuate periphery of the shank for holding the same, an arm pivotally mounted on one of said upright members, a spreading member formed on said arm and adapted to overlie said shank and an impact receiving surface formed on said arm above said spreading member.

4. In a forming tool for arcuate shanks of the type used in inserted tooth saws and having arcuate peripheral surfaces which in section are V-shaped grooves, a base, a pair of upright members fixed to said base, a pair of swage plates slidably mounted in said upright members and said base to hold the swage plates in a vertical plane, arcuate seating surfaces in the upper portions of said swage plates, said seating surfaces in section forming inverted V's which are adapted to interfit with the V-shaped groove in said shank, a rod fixed to one of said swage plates and extending horizontally in a plane coincident with the plane of said swage plates and passing through a hole in one of said upright members, a slot intermediate the ends of said rod, said slot loosely holding the other of said swage plates, means threaded on the end of said rod remote from the swage plates for varying the position of said swage plates with respect to each other to engage the arcuate periphery of a shank for holding the same, an arm pivotally mounted on one of said upright members, a spreading member formed on said arm and adapted to overlie the shanks held by said swage plates, and an impact receiving surface formed on said arm above said spreading member.

5. In a forming tool for arcuate shanks used in inserted tooth saws, said shanks having an inner arcuate surface and an outer peripheral surface, said forming tool comprising holding means having an arcuate seating surface on one edge adapted to accommodate the outer arcuate peripheral surface of a shank, an arm connected to said holding means and movable to a position overlying said seating surface, a spreading member mounted on said arm and adapted to be moved into engagement with a shank mounted upon said seating surface, and an impact receiving surface formed on said arm above said spreading member, said spreading member having a radius greater than the radius of the inner arcuate surface of the shank so that as blows are applied to the impact receiving surface while the spreading surface is in engagement with a shank, said spreading member will cause spreading forces to be applied to said shank.

6. A forming tool as in claim 5 wherein said holding means includes a pair of swage plates lying in a single plane, the arcuate receiving surface being formed in the swage plates, and means for varying the position of said swage plates in said plane to accommodate a shank.

References Cited in the file of this patent

UNITED STATES PATENTS

| | | |
|---|---|---|
| 292,097 | Chalfant | Jan. 15, 1884 |
| 385,778 | Spencer | July 10, 1888 |
| 998,225 | Arrowsmith | July 18, 1911 |
| 1,559,454 | Pritner | Oct. 27, 1925 |
| 2,122,142 | Huck | June 28, 1938 |
| 2,291,666 | Wachowitz | Aug. 4, 1942 |
| 2,471,485 | Gruetjen | May 31, 1949 |